United States Patent
Torske

(10) Patent No.: US 11,427,335 B2
(45) Date of Patent: Aug. 30, 2022

(54) ENCLOSURE FOR CONTACTS OF AIRCRAFT WING HEATER BLANKET

(71) Applicant: Bell Helicopter Textron Inc., Fort Worth, TX (US)

(72) Inventor: Nicholas Allen Torske, Lewisville, TX (US)

(73) Assignee: TEXTRON INNOVATIONS INC., Providence, RI (US)

( * ) Notice: Subject to any disclaimer, the term of this patent is extended or adjusted under 35 U.S.C. 154(b) by 749 days.

(21) Appl. No.: 16/189,722

(22) Filed: Nov. 13, 2018

(65) Prior Publication Data
US 2020/0148369 A1  May 14, 2020

(51) Int. Cl.
*B64D 15/12* (2006.01)

(52) U.S. Cl.
CPC .......... *B64D 15/12* (2013.01); *B64D 2221/00* (2013.01); *H01R 2201/26* (2013.01); *H05B 2203/016* (2013.01)

(58) Field of Classification Search
CPC ................ B64D 15/12; B64D 2221/00; H01R 2201/26; H05B 2203/016
See application file for complete search history.

(56) References Cited

U.S. PATENT DOCUMENTS

| | | | |
|---|---|---|---|
| 4,060,212 A | 11/1977 | Magenheim | |
| 5,351,918 A * | 10/1994 | Giamati | B64D 15/12 244/134 D |
| 5,558,304 A | 9/1996 | Adams | |
| 5,934,617 A | 8/1999 | Rutherford | |
| 6,027,075 A | 2/2000 | Petrenko | |
| 6,206,325 B1 | 3/2001 | Nunnally | |
| 6,227,492 B1 * | 5/2001 | Schellhase | B64D 15/12 244/134 D |
| 6,818,831 B2 | 11/2004 | Petrenko | |
| 7,523,889 B2 | 4/2009 | Bourjac et al. | |
| 7,604,202 B2 | 10/2009 | Froman et al. | |
| 7,807,251 B1 | 10/2010 | Wallach | |
| 8,550,402 B2 * | 10/2013 | Houlihan | B64D 15/14 244/134 D |
| 9,038,363 B2 | 5/2015 | Pereira et al. | |
| 9,090,797 B2 | 7/2015 | Tang et al. | |
| 9,221,544 B2 | 12/2015 | Armatorio et al. | |
| 9,457,909 B2 | 10/2016 | Ribarov et al. | |
| 9,585,198 B2 | 2/2017 | Modrzejewski et al. | |
| 9,868,535 B2 | 1/2018 | Leschi et al. | |
| 10,017,262 B2 | 7/2018 | Botura et al. | |
| 10,457,402 B2 * | 10/2019 | Seminel | F01D 25/02 |

(Continued)

*Primary Examiner* — Nicholas McFall
(74) *Attorney, Agent, or Firm* — Pramudji Law Group PLLC; Ari Pramudji

(57) ABSTRACT

Briefly, the disclosure relates to apparatuses and methods to enclose electrical contacts for de-icing equipment utilized on fixed-wing aircraft and rotary-wing aircraft, such as helicopters and tiltrotor aircraft. In some implementations, enclosing electrical contacts for a de-ice heater blanket may ensure that high-quality electrical connections are made between conductors of one or more de-icing cables and the electrical contacts of the de-ice heater blanket. Such high-quality electrical connections may be maintained even during aircraft operations conducted in below-freezing ambient environments, rainy and/or wet environments, dusty desert environments, and so forth.

18 Claims, 5 Drawing Sheets

(56) References Cited

U.S. PATENT DOCUMENTS

| | | | |
|---|---|---|---|
| 10,710,732 B2* | 7/2020 | Aubert | B64D 15/12 |
| 2007/0257153 A1* | 11/2007 | Froman | B64C 29/0033 |
| | | | 244/134 D |
| 2011/0277443 A1 | 11/2011 | Pereira et al. | |
| 2014/0191084 A1 | 7/2014 | Gambino et al. | |
| 2017/0081033 A1* | 3/2017 | Steinwandel | B05D 3/0218 |
| 2017/0267361 A1 | 9/2017 | Longley, Jr. et al. | |

* cited by examiner

ENCLOSURE FOR CONTACTS OF AIRCRAFT WING HEATER BLANKET

STATEMENT REGARDING FEDERALLY SPONSORED RESEARCH OR DEVELOPMENT

Not applicable.

BACKGROUND

This section is intended to provide background information to facilitate an understanding of various technologies described herein. As the section's title implies, this is a discussion of related art. That such art may be related in no way implies that such art is prior art. It should therefore be understood that the statements in this section are to be read in this light and not as admissions of prior art.

For a fixed-wing or rotary-wing aircraft to operate in an environment that may permit ice to form on a control surface or other surface of the aircraft, a de-icing system may be utilized to detect and/or remove such ice from the surface. For example, in a rotary-wing aircraft, such as a helicopter, a de-icing heating element may be embedded within the helicopter's rotor blades. Accordingly, responsive to detection of an accumulation of ice on a helicopter rotor blade, or detection of conditions that may give rise such accumulation, a rotor blade de-icing system may be activated. Activation of a de-icing system may operate to ensure that ice accumulation does not negatively impact aircraft performance, mission-readiness, crew safety, and so forth.

However, providing electrical power to control operation of one or more de-icing heating elements may require electrical contacts to be capable of low-loss conduction of significant electrical currents so as to provide sufficient temperature elevation of heating elements. In addition, a de-icing system may utilize relatively low-current voltage signals to perform control functions of the one or more de-icing heating elements. Thus, low-loss conduction of relatively high electrical currents as well as low-noise conduction of other types of voltage signals may be important for optimum functionality of a de-icing system. Further, such low-loss/low-noise conduction of electrical currents may be required under a variety of adverse weather conditions, such as during exposure to freezing rain, hail, sleet, snow, and so forth. Accordingly, aircraft equipment and design techniques for providing weather-resistant, low-loss/low-noise conduction of electrical currents to de-icing systems continues to be an active area of interest.

SUMMARY

Briefly, particular implementations of claimed subject matter may relate to an aircraft wing, such as a stationary wing utilized by a fixed-wing aircraft or a rotary-wing utilized by a helicopter or tiltrotor aircraft, may comprise a wing spar at least partially enclosed within a sheath. The aircraft wing may further comprise a de-ice heater blanket coupled to the sheath to provide heating of at least a portion of the sheath. In another implementation, the one or more contacts may be configured to deliver electrical power to the de-ice heater blanket, wherein the one or more contacts are positioned proximate to the root of the aircraft wing and at a location between the sheath and the spar. In another implementation, an outer closure may be positioned between the spar and the sheath to virtually or fully enclose the one or more contacts. The outer closure may comprise one or more provisions for cable routing to deliver electrical signals and/or electrical power to the one or more contacts. Electrical contacts may be positioned at an apex region of the sheath and may be positioned on an inner surface of the sheath and oriented in a direction toward the spar of the aircraft wing.

In another implementation, a spar and a sheath of an aircraft wing may be approximately coextensive with each other along the length of the aircraft wing. In an implementation, the heater blanket may be positioned or situated between an abrasion strip, which may be located at a leading edge of the aircraft wing, and the sheath of the aircraft wing.

In another implementation, an aircraft may comprise a heater blanket at one or more wings of the aircraft. The aircraft may additionally comprise one or more enclosures positioned at a root of a corresponding wing of the one or more wings of the aircraft, wherein the one or more enclosures is at least partially shielded from an environment ambient to the aircraft. The aircraft may further comprise one or more groupings of electrical contacts, wherein the one or more groupings of electrical contacts is positioned within corresponding enclosures of the one or more enclosures. The one or more enclosures may comprise provisions for cable routing to deliver electrical power to the one or more groupings of electrical contacts. In particular implementations, the aircraft may comprise a fixed-wing aircraft or a rotary-wing aircraft, such as a helicopter or a tiltrotor aircraft.

In another implementation, a heater blanket for an aircraft wing may be positioned between a leading edge of a corresponding wing of the one or more wings of the aircraft and a spar of the corresponding wing of the one or more wings of the aircraft. In another implementation, the one or more groupings of electrical contacts may be positioned at apex regions of corresponding enclosures of the one or more enclosures. In another implementation, the one or more enclosures is positioned at an upward-facing side of the root of a corresponding one or more wings of the aircraft.

Another implementation relates to a method of fabricating an aircraft wing, which may comprise attaching a heater blanket and a sheath to a spar of the aircraft wing. The method may further comprise attaching an inner closure to a region of the sheath proximate to the root of the aircraft wing and attaching one or more electrical contacts to the heater blanket within an at least partial enclosure formed by the heater blanket and the inner closure. In an implementation, attaching the one or more electrical contacts comprises attaching the one or more electrical contacts to an apex region of the at least partial enclosure. In an implementation, the heater blanket and sheath may be combined, such as bonded together, prior to curing the combined heater blanket and sheath. In another implementation, the heater blanket and the sheath may be cured followed by bonding the heater blanket to the sheath.

In an implementation, a method may additionally comprise attaching an outer closure to the heater blanket and to the spar to form a complete or at least virtually complete enclosure from the at least partial enclosure. In another implementation, an abrasion strip may be bonded to the heater blanket.

BRIEF DESCRIPTION OF THE DRAWINGS

The present technique(s) will be described further, by way of example, with reference to implementations thereof as illustrated in the accompanying drawings. It should be understood, however, that the accompanying drawings illustrate only the various implementations described herein

Figure 1:
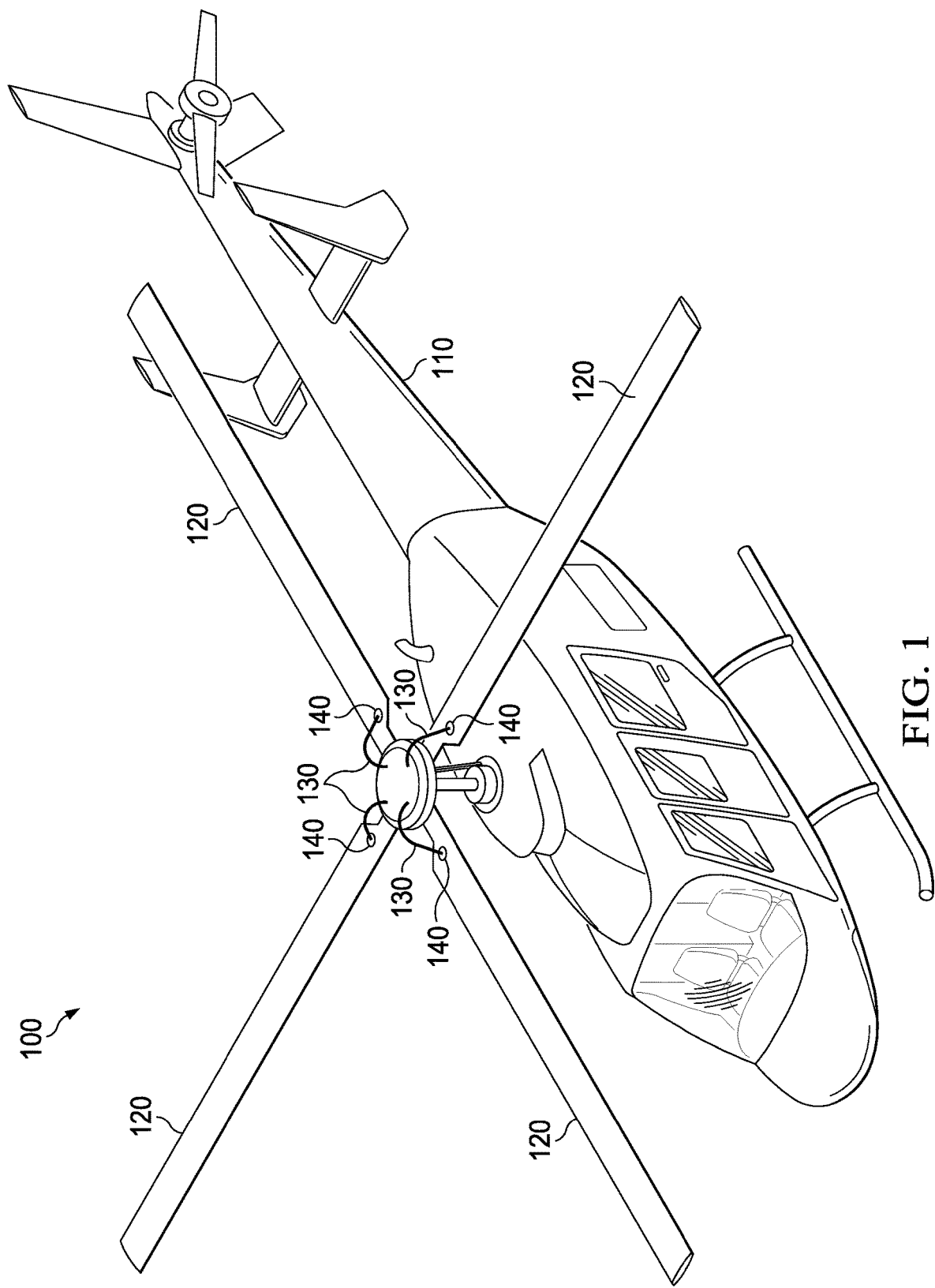
FIG. 1 shows a representative aircraft depicting cables for a heater blanket, wherein the aircraft cables terminate at contacts positioned on an upward-facing surface of a rotary-wing aircraft according to an implementation described herein.

Reference is made in the following detailed description to accompanying drawings, which form a part hereof, wherein like numerals may designate like parts throughout that are corresponding and/or analogous. It will be appreciated that the figures have not necessarily been drawn to scale, such as for simplicity and/or clarity of illustration. For example, dimensions of some aspects may be exaggerated relative to others. Further, it is to be understood that other implementations may be utilized. Furthermore, structural and/or other changes may be made without departing from claimed subject matter. References throughout this specification to "claimed subject matter" refer to subject matter intended to be covered by one or more claims, or any portion thereof, and are not necessarily intended to refer to a complete claim set, to a particular combination of claim sets (e.g., method claims, apparatus claims, etc.), or to a particular claim. It should also be noted that directions and/or references, for example, such as up, down, top, bottom, and so on, may be used to facilitate discussion of drawings and are not intended to restrict the scope of claimed subject matter. Therefore, the following detailed description is not to be taken to limit claimed subject matter and/or equivalents.

DETAILED DESCRIPTION

As previously mentioned, fixed-wing and rotary-wing aircraft, which may include various types of commercial and military fixed-wing aircraft, helicopters, and tiltrotor aircraft, for example, may occasionally operate in an environment that permits formation of ice on a control surface or other surface of the aircraft. In such instances, an onboard de-icing system may be utilized to detect and/or remove accumulations of ice from aircraft surfaces. For example, in a rotary-wing aircraft, such as a helicopter, a de-icing heating element may be embedded within the helicopter's rotor blades. Accordingly, responsive to detection of an accumulation of ice on one or more helicopter rotor blades, or detection of conditions that may enable an accumulation of ice, a helicopter rotor blade de-icing system may be activated. Activation of a de-icing system may operate to remove accumulated ice so as to ensure that such accumulation does not negatively impact aircraft performance, mission-readiness, crew safety, and so forth.

However, an aircraft control surface, such as a control surface of a fixed or rotary-wing aircraft, may comprise significant surface area. Accordingly, maintaining an ice-free surface, either by precluding or preventing formation of ice or by removing accumulated ice, may involve use of substantial electrical current in order to sufficiently increase the temperature of a de-ice heating element. Thus, an aircraft de-icing system may utilize low-loss electrical contacts, which may operate to convey relatively large electrical currents from aircraft cables to de-ice heating elements. Accordingly, a premium may be placed on providing low-loss electrical contacts of an aircraft de-icing system and on maintaining such low-loss properties of electrical contacts even while the aircraft is exposed to inclement weather, which may include ice, sleet, hail, freezing rain, and so forth.

In addition, an aircraft de-icing system may utilize relatively low-current signals to assist in performing control functions of one or more de-ice heating elements. For example, when an aircraft de-icing system utilizes signals from one or more thermal sensors, which may provide temperature parameters of an aircraft wing to a de-ice controller, for example, a premium may be placed on providing and maintaining electrical contacts that preserve the integrity of low-level signals. By preserving such signal integrity, signals reporting temperature parameters of a blade heating element, for example, may be accurately conveyed to a de-ice controller. In particular implementations, reporting of temperature parameters may ensure optimal operation of an aircraft de-ice system, in which sufficient, but not excessive, aircraft electrical power resources are allocated for control and/or prevention of ice accumulation. Such prudent use of electrical power for de-icing systems may ensure that sufficient aircraft power resources remain to perform other aircraft functions, such as communications, navigation, targeting, fire control, etc.

In particular implementations of claimed subject matter, an enclosure to enclose contacts of an aircraft wing heater blanket brings about an approach for providing and maintaining low-loss coupling of high-current signals from, for example, an aircraft de-ice controller. In addition, responsive to positioning of electrical contacts within an enclosure, which may ensure that electrical contacts are not degraded responsive to exposure and/operation of the aircraft during inclement weather, low-loss coupling of high-current signals may be maintained for extended periods of time. Further, and also responsive to positioning of electrical contacts within an enclosure, protecting electrical contacts from harsh environmental conditions may preclude oxidation or other type of degradation of electrical contacts. In turn, an aircraft de-icing system may operate optimally and in a manner that provides sufficient aircraft electrical power to prevent and/or remove accumulated ice, while ensuring that sufficient aircraft power resources remain available for use by other aircraft avionics and/or flight control systems.

Particular implementations of claimed subject matter will now be described with reference to the figures, such as FIG. 1, which shows a representative aircraft 100 depicting cables for a heater blanket terminating at contacts positioned on an upward-facing surface of a helicopter according to an implementation described herein. Although representative aircraft 100 shows a rotary-wing aircraft (e.g., a helicopter), implementations of claimed subject matter are not limited to applications of such aircraft types. Rather, claimed subject matter is intended to embrace a variety of aircraft environments, such as commercial or military aircraft utilizing one or more fixed wings, tiltrotor aircraft, commercial and military helicopters, and so forth. Additionally, although representative aircraft 100 comprises four of helicopter blades 120, implementations of claimed subject matter may be applied to aircraft comprising any number of blades 120, such as helicopters or tiltrotor aircraft comprising two blades, three blades, five blades, and so forth, virtually without limitation.

In FIG. 1, representative aircraft 100 comprises a rotor hub and standpipe, which are linked to each of rotor blades 120. Cables 130, which may originate from, for example, a de-ice controller (not shown in FIG. 1), may pass upward through a standpipe in the direction of the rotor hub. As shown in FIG. 1, cables 130 may emanate from a location near the rotor hub and outward toward each of blades 120 before terminating at electrical contact groups 140. In particular implementations, connection of electrical cables 130 with electrical contact groups 140 may be achieved by utilizing male/female connectors which operate to connect one or more conductors of each of electrical cables 130 with a corresponding one or more contacts of each of electrical contact groups 140. Thus, by way of the arrangement of FIG. 1, electrical cables 130 may provide primary power to a heater blanket embedded within each of rotor blades 120 as well as receiving performance parameters, such as an indication of blade temperature, for example, from rotor blades 120.

However, it may be appreciated that de-ice electrical cables 130 and electrical contact groups 140 may be at least occasionally exposed to a harsh ambient environment, which may degrade the integrity of metal-to-metal contacts of de-ice electrical cables 130 and electrical contact groups 140. For example, during aircraft operations in rainy or wet weather, materials utilized to insulate individual conductors of de-ice electrical cables 130 and electrical contact groups 140 may become saturated with water, which may bring about an electrical short circuit between adjacent contacts of an electrical contact group. In another example, responsive to exposure to excessively cold temperatures, conductors of contact groups 140 and de-ice electrical cables 130 may shrink, which may permit a gap to at least occasionally form between one or more conductors of a contact group and a conductor of a de-ice electrical cable. In another example, responsive to operation in dry desert environments, dust and/or dirt particles may accumulate within gaps or openings between of de-ice electrical cables 130 and electrical contact groups 140. Over time, such dust and/or dirt particles, especially in response to operation in helicopter vibration environments, for example, may intrude into areas at which metal-to-metal contact is made between conductors of de-ice electrical cables 130 and conductors of electrical contact groups 140. Such intrusion of dirt and/or dust particles may bring about increased impedance between conductors of cables 130 and contact groups 140. Exposure of de-ice electrical cables 130 and conductors of electrical contact groups 140 may be detrimental to the performance of a de-icing system of representative aircraft 100 for additional reasons.

Figure 2:
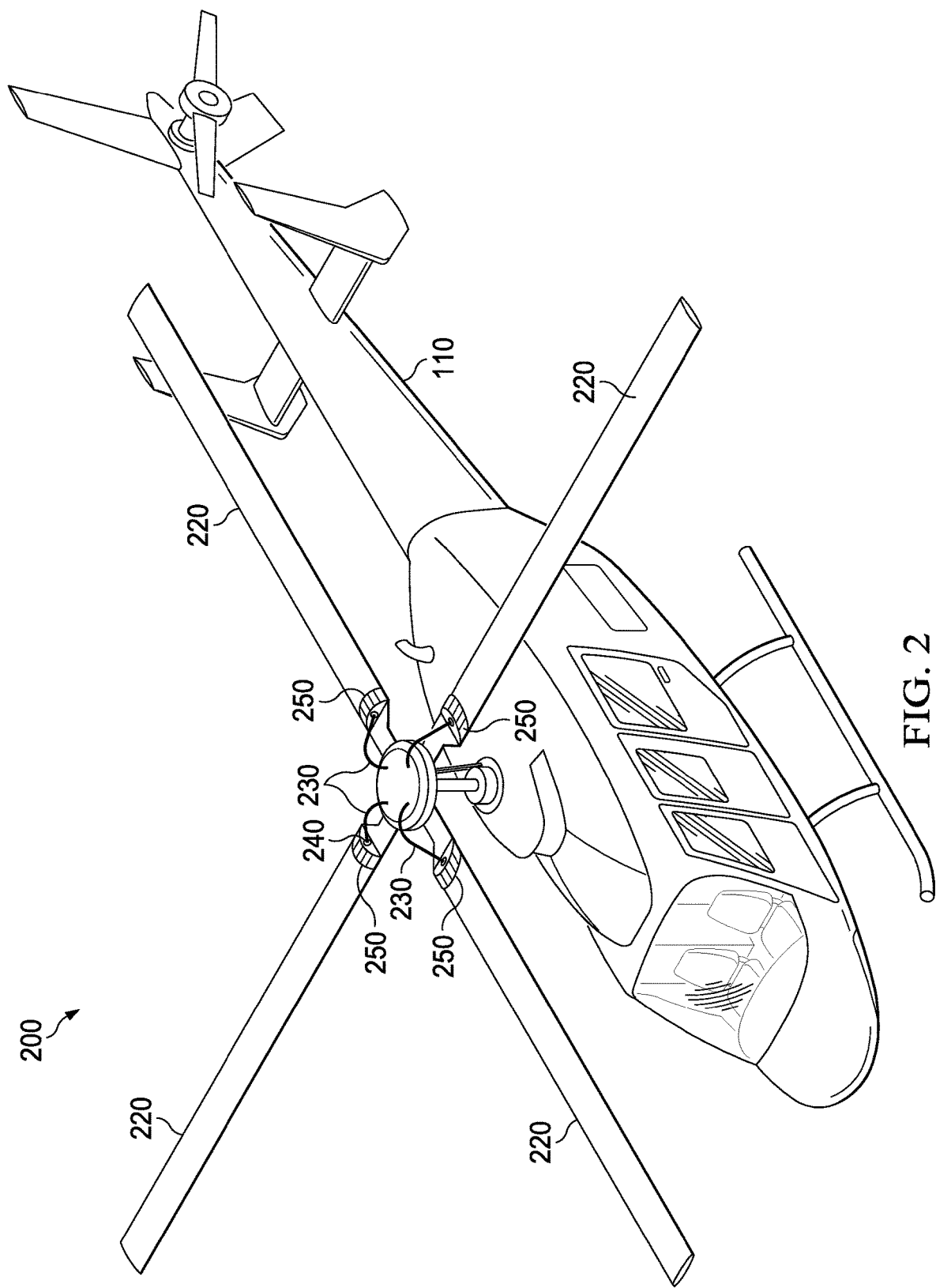
FIG. 2 shows a representative aircraft depicting cables for a heater blanket, wherein the aircraft cables terminate within an enclosure positioned on a rotary-wing of the representative aircraft according to another implementation described herein.

FIG. 2 shows a representative aircraft 200 depicting cables for a heater blanket terminating at contacts within an enclosure 250 positioned on rotary wings of the representative aircraft according to another implementation described herein. Thus, as shown in FIG. 2, each of rotor blades 220 may comprise an enclosure 250, which may function as a shelter for electrical contact groups 240. Accordingly, in particular implementations, de-ice electrical cables 230, which may operate in a manner similar to de-ice electrical cables 130 of FIG. 1, may be secured to a corresponding electrical contact group 240 within a weather-resistant enclosure, such as enclosure 250. Consequently, during operations of representative aircraft 200 in rainy, wet conditions, for example, metal-to-metal contact between conductors of de-ice electrical cables 230 and electrical contact groups 240 may be maintained relatively free of moisture. In another example, during operations of representative aircraft 200 in dusty environments, enclosure 250 may provide protection of metal-to-metal contacts of contact groups 240 and cables 230 from airborne dust particles. Enclosure 250 may provide additional measures of protection of metal-to-metal contacts between contact groups 240 and cables 230, and claimed subject matter is not limited in this respect.

Figure 3A:
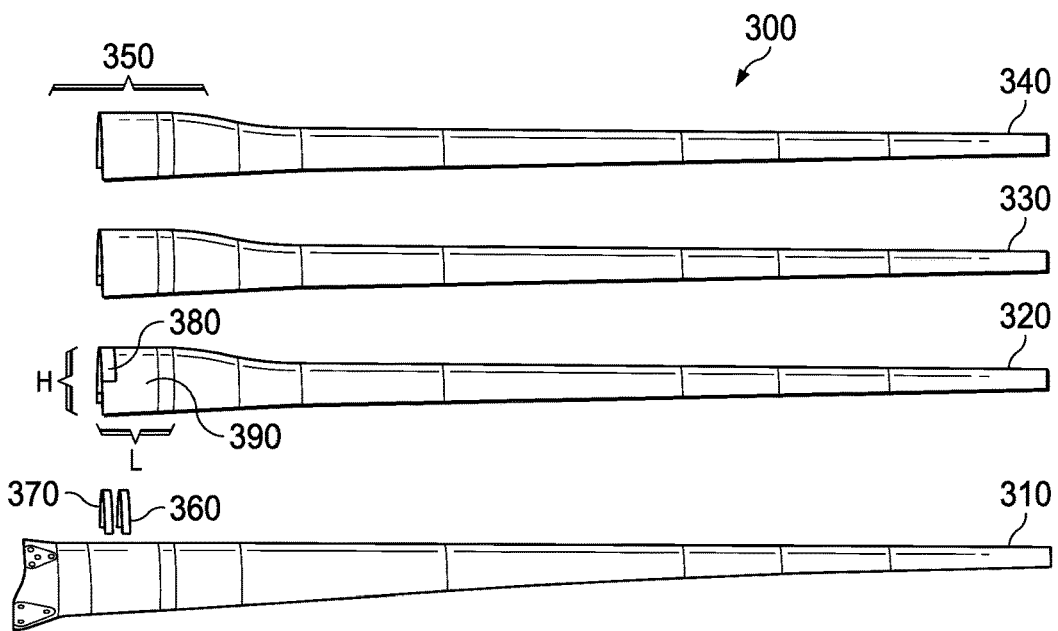
FIGS. 3A-3B is an illustration depicting components of an aircraft rotary-wing according to another implementation described herein.
Figure 3B:
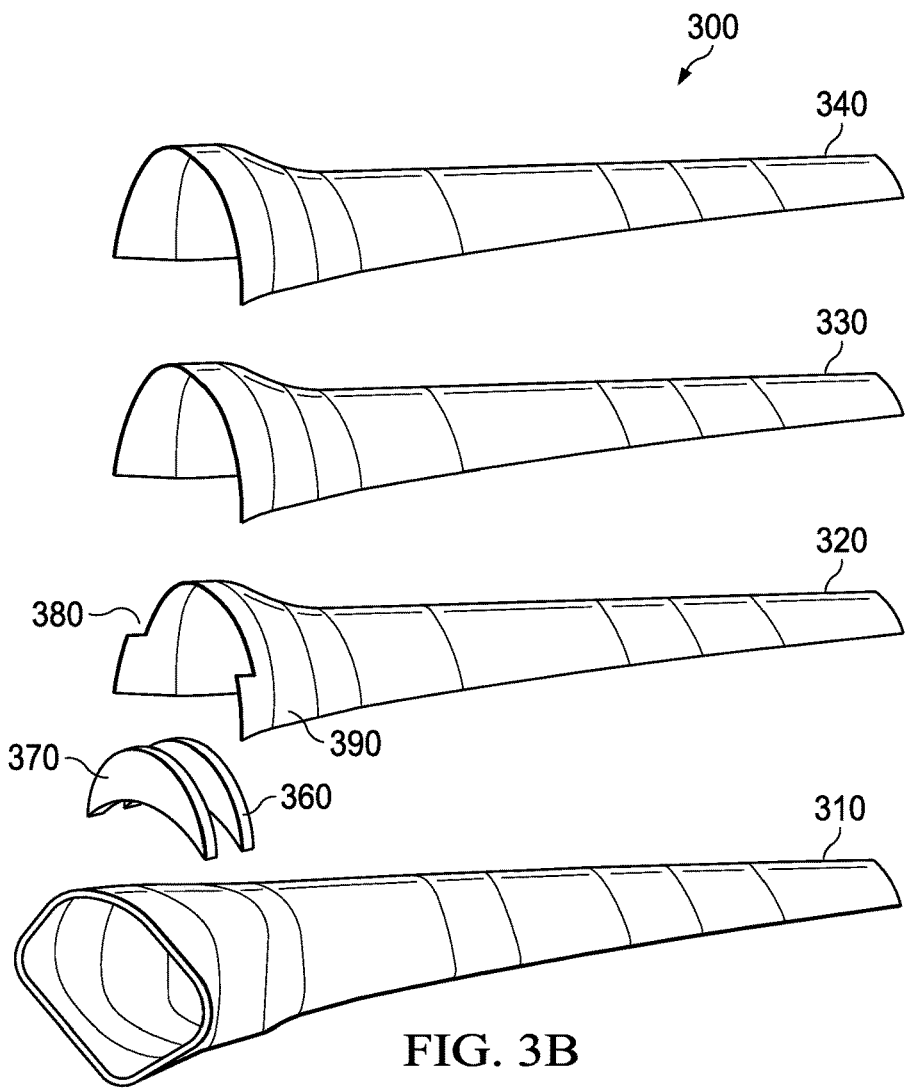

FIGS. 3A-3B is an illustration depicting components of a rotary wing 300 according to another implementation described herein. In FIG. 3A, rotary wing spar 310 comprises a hollow or solid metal shaft, which provides primary structural support for the remaining components of FIG. 3A. In another implementation, rotary wing spar 310 may comprise one or more composite materials, such as carbon fiber. Although not shown in FIG. 3A, rotary wing spar 310 may be attached to other structural and/or control elements of a rotor system, such as a swashplate, pitch link, pitch horn, etc. Rotary wing spar 310 may make other connections and/or couplings to mechanical components of a rotary-wing aircraft, and claimed subject matter is not limited in this respect.

Sheath 320 of FIG. 3A, which may be coextensive in length with rotary wing spar 310, may be bonded to rotary wing spar 310 so as to remain coupled to blade spar 310 during all flight envelopes of a rotary-wing aircraft. In the implementation of FIG. 3A, sheath 320 may structurally cooperate with rotary wing spar 310 so as to form an airfoil, thereby providing an appropriate amount of lift to a rotary-wing aircraft. Sheath 320 may comprise enclosure 390, located at root portion 350 (as indicated by line 355) of rotary wing 300, which may be utilized to form a shelter for one or more electrical contacts of an electrical contact group. Enclosure 390 may be positioned so as to face in a direction of a center portion of the aircraft. In particular implementations, enclosure 390 may comprise a first dimension, such as height ("H" in FIG. 3A) of between about 5.08 cm (~2.0 inches) and about 25.4 cm (~10.0 inches), although claimed subject matter is intended to embrace an enclosure formed by sheath 320 having any height, virtually without limitation. In particular implementations, enclosure 390 may comprise a second dimension, such as length ("L" in FIG. 3A) of between about 5.08 cm (~2.0 inches) and about 30.48 cm (~12.0 inches), although claimed subject matter is intended to embrace an enclosure formed by sheath 320 having any length, virtually without limitation.

Inner closure 360 of FIG. 3A may form an inner boundary of enclosure 390, so as to restrict travel of cables, for example, into adjacent regions between rotary wing spar 310 and sheath 320. In particular implementations, edges of inner closure 360 may be bonded to sheath 320 so as to prevent intrusion of water, dirt, or other potentially unwanted materials into an adjacent region between rotary wing spar 310 and sheath 320. FIG. 3A additionally depicts outer closure 370, which may form an outer wall of enclosure 390, thereby forming a complete enclosure bounded by outer closure 370, rotary wing spar 310, sheath 320, and inner closure 360. Although not shown in FIG. 3A, outer closure 370 may comprise one or more cable passages through which a corresponding number of cables may pass, such one or more electrical cables of a de-icing system.

Rotary wing 300 may additionally comprise heater blanket 330, which may provide resistive heating for use during aircraft operations conducted at below-freezing ambient temperatures. In particular implementations, heater blanket 330 may be designed to provide resistive heating capabilities in accordance with aircraft operational requirements. Accordingly, for aircraft operating in ambient environments that only occasionally comprise temperatures slightly below freezing for brief periods of time, heater blanket 330 may provide relatively moderate resistive heating capabilities. However, for aircraft operating in ambient environments that often comprise temperatures well below freezing for extended periods of time, heater blanket 330 may provide relatively robust resistive heating capabilities. Heater blanket 330 may be protected from abrasion and/or bird strike, which may occur during aircraft operations, by leading edge abrasion strip 340.

Heater blanket 330 may comprise one or more electrical contact groups, which may be positioned on an underside of blanket 330 (not shown in FIG. 3A). In particular implementations, the one or more electrical contact groups may extend through cutout 380 and into enclosure 390 in the direction of rotary wing spar 310. Accordingly, after fastening one or more electrical cables to one or more electrical contact groups, outer closure 370 may be affixed, thereby forming a substantially complete enclosure that protects the interface between contacts of a de-ice electrical cable and electrical contact groups of heater blanket 330.

FIG. 3B is an illustration depicting components of rotary wing 301, which may comprise features similar to those of rotary wing 300, according to another implementation described herein. In FIG. 3B, rotary wing spar 310, inner closure 360, outer closure 370, sheath 320, heater blanket 330, and leading edge abrasion strip 340 are oriented so as to depict additional details of the interior of enclosure 390 formed between rotary wing spar 310 and sheath 320.

Figure 4:
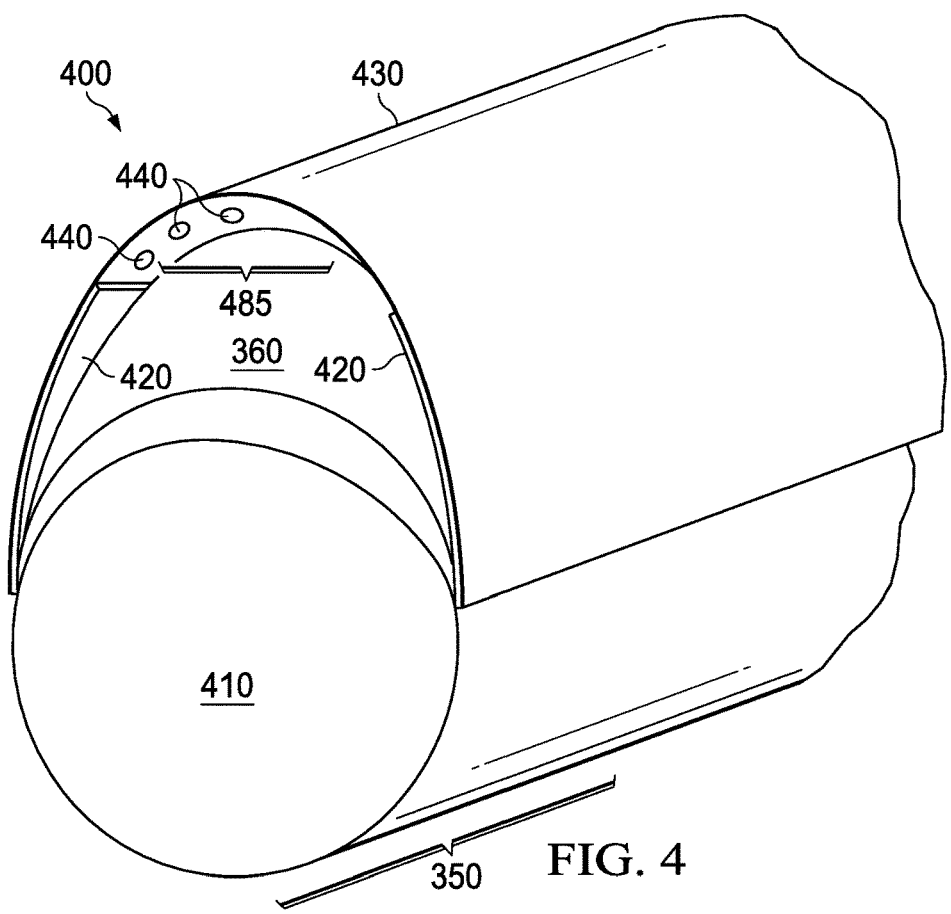
FIGS. 4-5 are illustrations depicting an enclosure for contacts of an aircraft wing heater blanket according to another implementation described herein.

FIG. 4 is an illustration depicting an enclosure for contacts of an aircraft wing heater blanket according to another implementation 400 described herein. In FIG. 4, wing spar 410, which may comprise a spar utilized to provide structural support for components of a rotary wing or for components of a fixed wing, may comprise root portion 350. In an implementation, such as that of a rotary-wing aircraft, root portion 350 may attach to a mast of a helicopter or may attach to a mast of a tiltrotor aircraft. In another implementation, such as that of a fixed-wing aircraft, root portion 350 may attach to an aircraft fuselage.

In FIG. 4, sheath 420 may be bonded or otherwise affixed to wing spar 410 so as to structurally cooperate with wing spar 410 in forming an airfoil, thus being capable of providing lift to a rotary- or fixed-wing aircraft, for example. Sheath 420 may comprise a cutout, through which electrical contacts 440 may protrude. Accordingly, de-ice electrical cables may be connected directly to electrical contacts 440, which may be accessible from an underside of heater blanket 430. In particular implementations, electrical contacts 440 may be positioned at or near apex region 485 of an enclosure bounded by wing spar 410, inner closure 360, sheath 420, heater blanket 430, and outer closure 370. Such implementations may provide increased volume within the enclosure, thus permitting routing within the enclosure of one or more multi-conductor cables comprising a relatively large bend radius.

Figure 5:
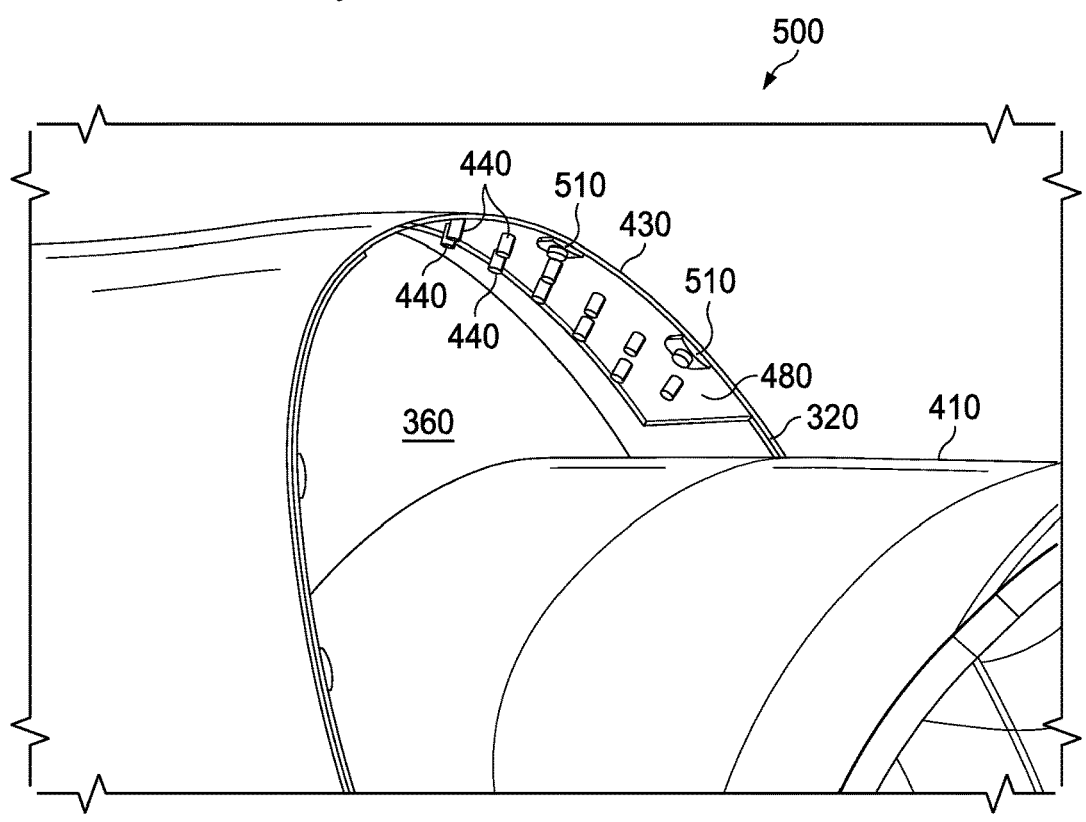
Figure 7:
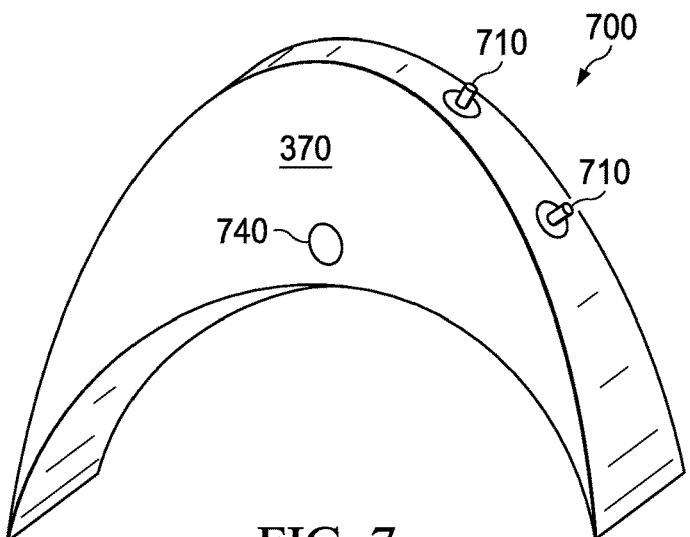
FIG. 7 is an illustration depicting an outer closure utilized to form an enclosure for contacts of an aircraft wing heater blanket according to another implementation described herein.

FIG. 5 is an illustration depicting an enclosure for contacts of an aircraft wing heater blanket according to another implementation 500 described herein. As depicted in FIG. 5, a volume bounded by wing spar 410, inner closure 360, heater blanket 430, and sheath 420 may form an enclosure for at least partially enclosing electrical contacts 440 of heater blanket 430. In FIG. 5, cutout 480 in sheath 420 permits electrical contacts 440 of heater blanket 430 protrude into the enclosure and in the direction of wing spar 410. FIG. 5 also depicts anchors 510, which may matingly secure with corresponding fasteners of an outer closure, such as shown in FIG. 7.

Figure 6:
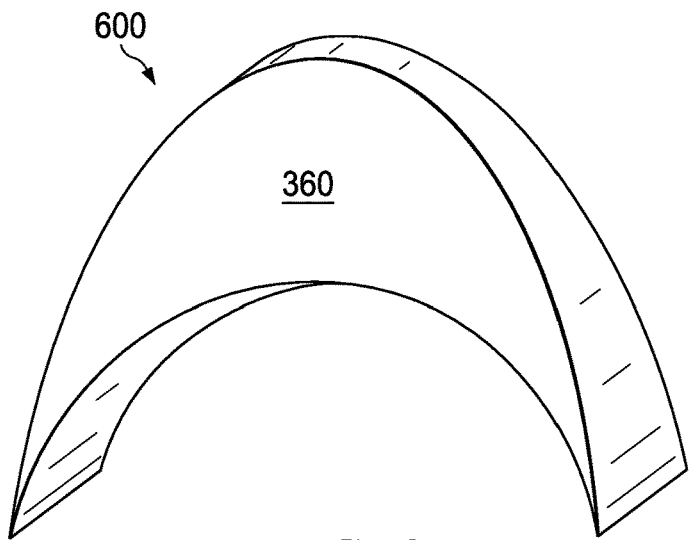
FIG. 6 is an illustration depicting an inner closure utilized to form an enclosure for contacts of an aircraft wing heater blanket according to another implementation described herein.

FIG. 6 is an illustration depicting an inner closure utilized to form an enclosure for contacts of an aircraft wing heater blanket according to an implementation 600 described herein. Inner closure 360 may comprise any material suited for use in fixed-wing aircraft, helicopter, or tiltrotor aircraft environments, and claimed subject matter is not limited in this respect. Similarly, outer closure 370 of implementation 700 may be utilized to complete an enclosure for contacts of an aircraft wing heater blanket. Outer closure 370, shown in FIG. 7, may comprise passage 740, which may permit an electrical cable to pass through the outer closure for fastening to one or more electrical contacts 440, such as shown in FIG. 5. In particular implementations, passage 740 may be positioned near the base of outer closure 370, which may thus provide for increased bend radius of cables routed through passage 740 for coupling to electrical contacts 440 located at apex 485, such as shown in FIG. 4. Outer closure 370 may additionally comprise fasteners 710 which may matingly secure with anchors 510 shown in FIG. 5.

Figure 8:
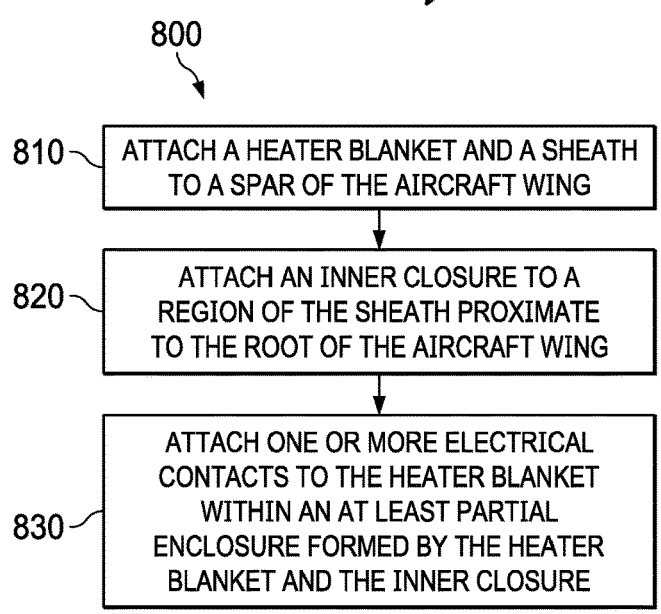
FIG. 8 is a flow chart for a method of fabricating an aircraft wing according to an implementation described herein.

FIG. 8 is a flow chart 800 for a method of fabricating an aircraft wing according to an implementation. FIG. 8 may include blocks in addition to those shown and described, fewer blocks or blocks occurring in an order different than may be identified, or any combination thereof. The method may begin at block 810, which may include attaching a heater blanket and a sheath to a spar of an aircraft wing. Thus, in particular implementations, block 810 may comprise attaching a heater blanket and a sheath to a spar of a wing of a fixed-wing aircraft. In another implementation, block 810 may comprise attaching a heater blanket and a sheath to a spar of a rotary-wing aircraft. In an implementation, a heater blanket and a sheath may be bonded together prior to curing the combined heater blanket and sheath. In another implementation, a heater blanket and sheath may be cured individually prior to combining a heater blanket with a sheath.

The method may continue at block 820, which may comprise attaching an inner closure, such as inner closure 360 described previously herein, to a sheath. In implementations, an inner closure may be attached at a location proximate to the root of an aircraft wing, and may operate to form an inner boundary of an enclosure, so as to restrict travel of cables, for example, into adjacent regions between an aircraft blade spar and a sheath, for example. The method may continue at block 830, which may comprise attaching one or more electrical contacts to the heater blanket within an at least partial enclosure formed by the heater blanket and the inner closure. Although not shown in FIG. 8, the method may continue with positioning an outer closure, such as outer closure 370 previously described herein, so as to form a substantially complete enclosure for contacts of an aircraft wing heater blanket. The method may also continue with bonding an abrasion strip to the heater blanket.

Although illustrative implementations of claimed subject matter have been described in detail herein with reference to the accompanying drawings, it is to be understood that the invention is not limited to those precise implementations, and that various changes, additions and modifications can be effected therein by one skilled in the art without departing from the scope of the invention as defined by the appended claims. For example, various combinations of the features of the dependent claims could be made with the features of the independent claims without departing from the scope of claimed subject matter.

What is claimed is:

1. An aircraft wing, comprising:
a spar that is at least partially enclosed within a sheath;
a de-ice heater blanket coupled to the sheath to provide heating of at least a portion of the sheath;
an outer closure positioned between the spar and the de-ice heater blanket; and
one or more contacts configured to deliver electrical power to the de-ice heater blanket,
wherein the one or more contacts are positioned proximate to the root of the aircraft wing and at a location between the sheath and the spar, and
wherein the outer closure, the spar and the sheath enclose the one or more contacts.

2. The aircraft wing of claim 1, wherein the outer closure comprises one or more provisions for cable routing to deliver the electrical power to the one or more contacts.

3. The aircraft wing of claim 1, wherein the aircraft wing comprises a rotary wing.

4. The aircraft wing of claim 1, wherein the spar and the sheath are approximately coextensive with each other along the aircraft wing.

5. The aircraft wing of claim 1, wherein the heater blanket is positioned between an abrasion strip and the sheath.

6. The aircraft wing of claim 1, wherein the one or more contacts are positioned at an apex region of the sheath.

7. The aircraft wing of claim 1, wherein the one or more contacts are positioned at an enclosure formed, at least in part, by the sheath and the spar at an upward-facing side of the aircraft wing.

8. An aircraft, comprising:
a heater blanket at one or more wings of the aircraft;
one or more enclosures positioned at a root of a corresponding wing of the one or more wings of the aircraft, wherein the one or more enclosures is at least partially shielded from an environment ambient to the aircraft; and one or more groupings of electrical contacts,
wherein the one or more groupings of electrical contacts are positioned within corresponding enclosures of the one or more enclosures,
wherein the one or more enclosures is at least partially defined by a spar of the wing.

9. The aircraft of claim 8, wherein the one or more wings of the aircraft comprises one or more rotary wings.

10. The aircraft of claim 8, wherein the heater blanket is positioned between a leading edge of a corresponding wing of the one or more wings of the aircraft and a spar of the corresponding wing of the one or more wings of the aircraft.

11. The aircraft of claim 8, wherein the one or more enclosures comprise provisions for cable routing to deliver electrical power to the one or more groupings of electrical contacts.

12. The aircraft of claim 9, wherein the one or more groupings of electrical contacts are positioned at apex regions of corresponding enclosures of the one or more enclosures.

13. The aircraft of claim 9, wherein the one or more enclosures are positioned so as to face in a direction of a center portion of the aircraft.

14. A method of fabricating an aircraft wing, comprising:
attaching a heater blanket and a sheath to a spar of the aircraft wing;
attaching an inner closure to a region of the sheath proximate to the root of the aircraft wing;
attaching an outer closure to the heater blanket and to the spar; and
attaching one or more electrical contacts to the heater blanket within an at least partial enclosure formed by the heater blanket and the inner closure,
wherein the outer closure, the spar and the sheath enclose the one or more contacts.

15. The method of claim 14, further comprising:
bonding the heater blanket and the sheath together; and
curing the heater blanket and the sheath after bonding.

16. The method of claim 14, further comprising:
curing the heater blanket and the sheath; and
bonding the heater blanket and the sheath after curing.

17. The method of claim 14, further comprising
bonding an abrasion strip to the heater blanket.

18. The method of claim 14, wherein attaching the one or more electrical contacts comprises attaching the one or more electrical contacts to an apex region of the at least partial enclosure.

* * * * *